United States Patent [19]
Conroy, Sr.

[11] Patent Number: 5,954,084
[45] Date of Patent: *Sep. 21, 1999

[54] PNEUMATIC CONTROL

[76] Inventor: Joseph P. Conroy, Sr., 4375 Hickory Ridge, Brunswick, Ohio 44212

[ * ] Notice: This patent is subject to a terminal disclaimer.

[21] Appl. No.: 09/054,744
[22] Filed: Apr. 3, 1998

Related U.S. Application Data

[63] Continuation-in-part of application No. 08/630,005, Apr. 8, 1996.

[51] Int. Cl.⁶ .................................................. B60C 23/00
[52] U.S. Cl. ........................................... 137/230; 137/224
[58] Field of Search .................................... 137/224, 230, 137/223; 152/415, 427

[56] References Cited

U.S. PATENT DOCUMENTS

| | | | |
|---|---|---|---|
| 2,900,007 | 8/1959 | Hoogendoorn | 152/415 |
| 4,660,590 | 4/1987 | Sanchez | 137/230 X |
| 4,700,763 | 10/1987 | Willimas | 152/427 X |
| 4,730,656 | 3/1988 | Goodell et al. | 137/224 X |
| 5,181,977 | 1/1993 | Gneiding et al. | 152/427 X |
| 5,295,504 | 3/1994 | Riquier et al. | 137/230 |
| 5,398,744 | 3/1995 | Street et al. | 152/427 X |
| 5,538,062 | 7/1996 | Stech | 152/415 X |
| 5,832,951 | 11/1998 | Conroy, Sr. | 137/230 |

Primary Examiner—John Rivell
Assistant Examiner—Meredith H. Schoenfeld
Attorney, Agent, or Firm—David R. Percio

[57] ABSTRACT

A pneumatic control apparatus and method controls gas pressure inside a tire (40) mounted on a wheel (32) which rotates about the centerline of an axle (30). A bleeder valve (28) is mounted on a body coaxially aligned with the axle centerline and is in fluid connection with a pneumatic fitting (23) on the tire. The bleeder valve allows gas inside the tire to be relieved to the atmosphere when the gas is above a set pressure. The coaxial alignment of the bleeder valve with the axle centerline permits the bleeder valve to relieve gas pressure unaffected by centrifugal forces.

25 Claims, 10 Drawing Sheets

PNEUMATIC CONTROL

CROSS REFERENCE TO RELATED APPLICATIONS

This application is a continuation-in-part application of co-pending application Ser. No. 08/630,005, filed Apr. 8, 1996.

TECHNICAL FIELD

This invention relates to a fluid control method and apparatus. Specifically the invention relates to a pneumatic control method and apparatus to control gas pressure in a tire, and more specifically to a tire rotated at high speed as in a race car.

BACKGROUND ART

During high speed operation of a pneumatic tire, such as on a race car tire mounted on a wheel, tire fill gas (typically air or nitrogen and hereinafter referred to as "air" or "gas") inside the tire expands. Tire pressure may increase to such an extent that operation or safety may be adversely affected. Air bleeders have been used to limit pressure in a tire by allowing air to escape at pressures above a set level. Bleeders are installed in the wheel, either in the valve stem hole or in a hole 180 degrees opposite the valve stem.

The tire bleeder described in U.S. Pat. No. 5,257,642 is one such bleeder manufactured by Aero-Weld. This bleeder is a round machined piece of aluminum approximately 5/8 inches in diameter and 3/4 inches long. It has a tapered seat, a poppet valve that is spring loaded against a knurled end cap. When the pressure inside a tire is high enough to overcome the spring pressure, the poppet valve opens, venting or bleeding air to the atmosphere. When sufficient air has escaped, the spring forces the poppet valve to close. The bleeder may be adjusted to a desired pressure by tightening or loosening an end cap. The end cap is locked in position by a lock nut.

A problem arises when the wheel is rotated at high speed. Centrifugal force works in an opposite direction of the bleeder poppet valve. That is, the centrifugal force from tire rotation is added to the spring force, thus requiring a higher tire pressure on the poppet valve before it can open, and not letting it bleed off air as desired at the set pressure. This increased pressure above the set pressure causes the tire to grow in size upsetting the balance of the race car.

Thus there exists the need for a method of regulating tire air pressure with a bleeder valve that is not affected by centrifugal force occurring when a tire is rotated at high speed.

DISCLOSURE OF INVENTION

It is an object of the present invention to provide a pneumatic control apparatus and method.

It is a further object of the present invention to provide a pneumatic control apparatus and method that releases air from a tire.

It is a further object of the present invention to provide a pneumatic control apparatus and method that releases air from a tire that will work with no other forces that will impair its working characteristics.

It is a further object of the present invention to provide a pneumatic control apparatus and method that releases air from a tire without being affected by forces due to tire rotation.

It is a further object of the present invention to provide a pneumatic control apparatus and method that is quickly, efficiently and conveniently installed in an axle.

It is a further object of the present invention to provide a pneumatic control apparatus and method that can be economically installed in an axle.

The foregoing objects are accomplished in a preferred form of the pneumatic control apparatus and method of the present invention by a body with an outside perimeter of the same approximate shape and size of the perimeter of the interior of an axle in which it is to be installed.

The foregoing objects are accomplished for a cylindrical hollow axle with a cylindrical body having an outside diameter slightly smaller than the inside diameter of the axle. The cylindrical body has a center passage extending therethrough in the direction of and coaxial with the axle centerline, and a second passage extending therethrough parallel to and offset radially from the axle centerline. The outboard side of the coaxially aligned center passage is attached to a bleeder valve.

Tubing pneumatically connected to the tire is routed from the tire through the offset passage in the cylindrical body inwardly into the interior of the hollow axle. The tubing is further pneumatically connected to the inboard side of the coaxially aligned center passage in the cylindrical body.

Air from the tire pressurizes the tubing, body and bleeder which are pneumatically connected with the tire. Pressure above the set pressure of the bleeder opens the bleeder thereby reducing tire pressure until the set pressure is reached and the bleeder closes. The coaxial location of the bleeder allows operation without being subjected to centrifugal forces as the wheel rotates.

BEST MODE FOR CARRYING OUT INVENTION

Figure 1:
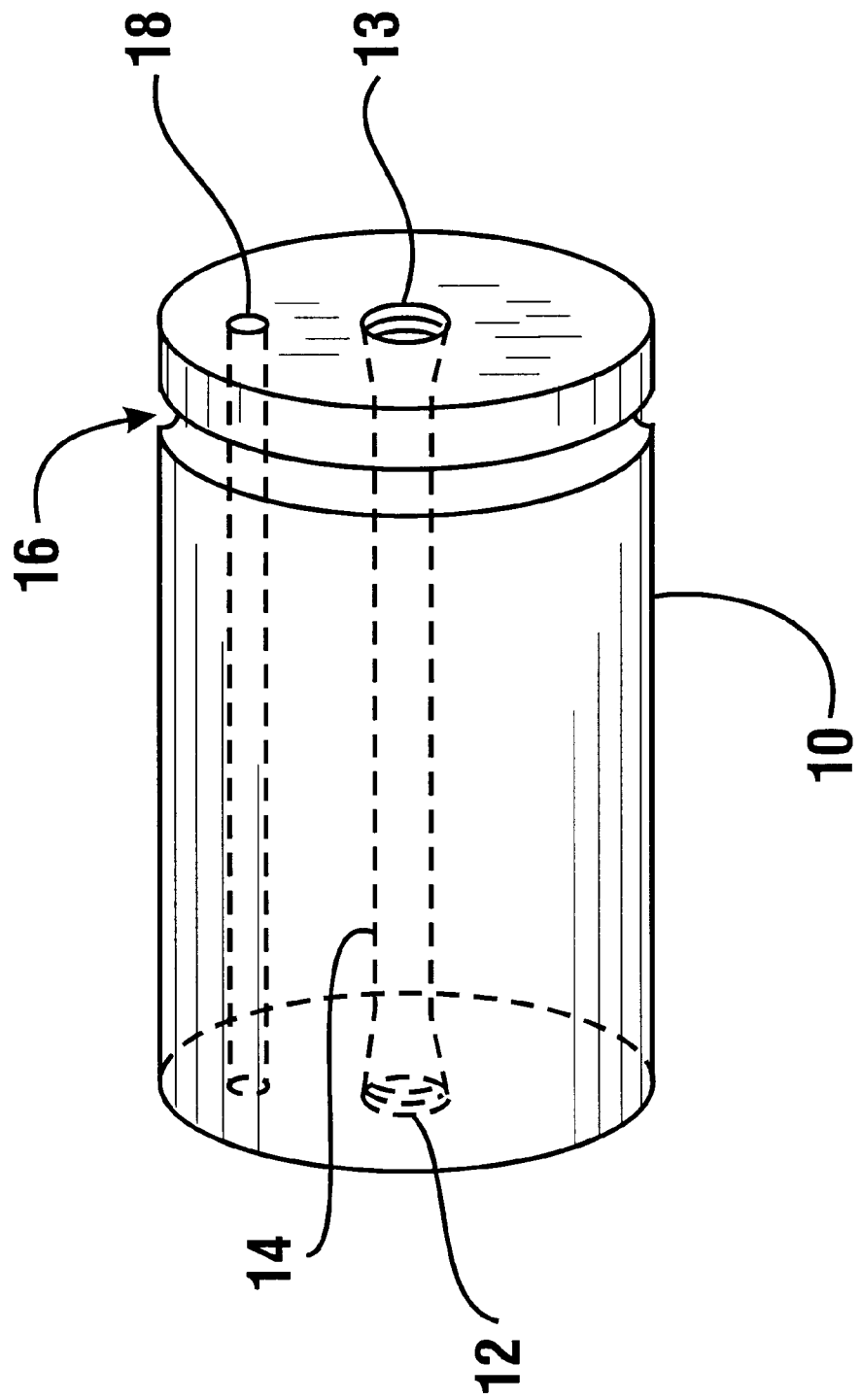
FIG. 1 is a perspective view of a first preferred embodiment a body of the pneumatic control of the present invention in the form of a cylindrical billet, and further showing in phantom a coaxially aligned center passage and offset passage.

Referring now to the drawings and particularly to FIGS. 3 and 10–15 there are shown therein preferred embodiments of the pneumatic control of the present invention.

Figure 3:
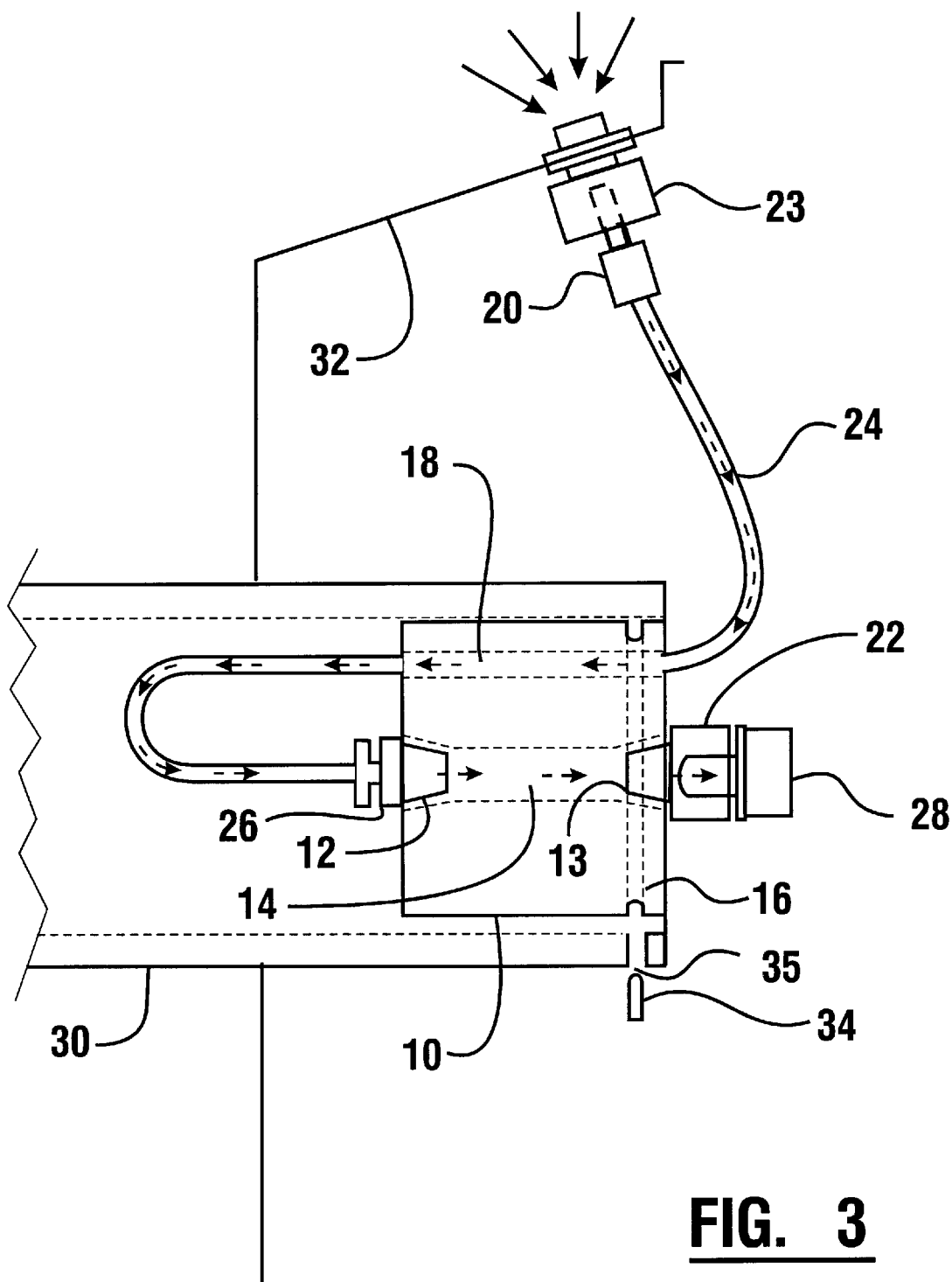
FIG. 3 is a side view of the pneumatic control of the present invention with the cylindrical billet of FIGS. 1 and 2 in place in a cutaway of a hollow axle and a wheel, and further showing in phantom the coaxially aligned center passage and the offset passage through the billet, the tubing through the offset passage and a connection of the tubing to a coupling, and the direction of air flow from inside the tire through the tubing and the billet and out through a bleeder.
Figure 4:
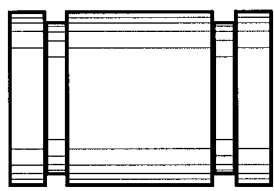
FIG. 4 is a side elevation of a second preferred embodiment of a cylindrical billet.
Figure 5:
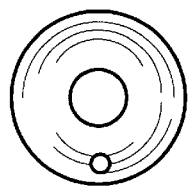
FIG. 5 is an end view of the outboard end of the billet of FIG. 4.
Figure 6:
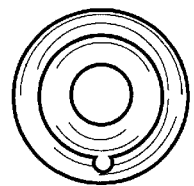
FIG. 6 is an end view of the inboard end of the billet of FIG. 4.
Figure 7:
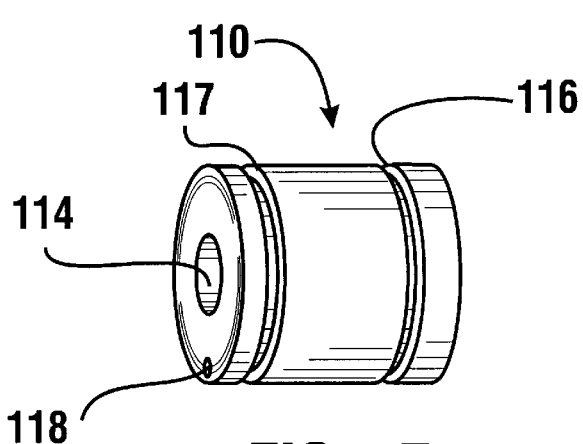
FIG. 7 is a perspective view of the billet of FIG. 4 showing an outboard end.
Figure 8:
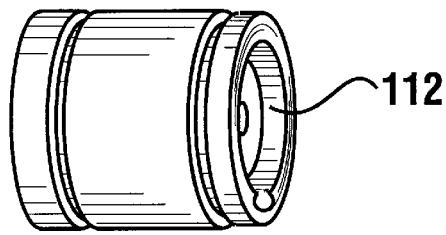
FIG. 8 is a perspective view of the billet of FIG. 4 showing an inboard end.
Figure 9:
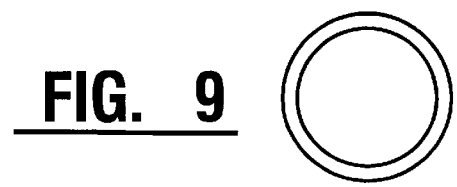
FIG. 9 is an end view of a gasket.
Figure 10:
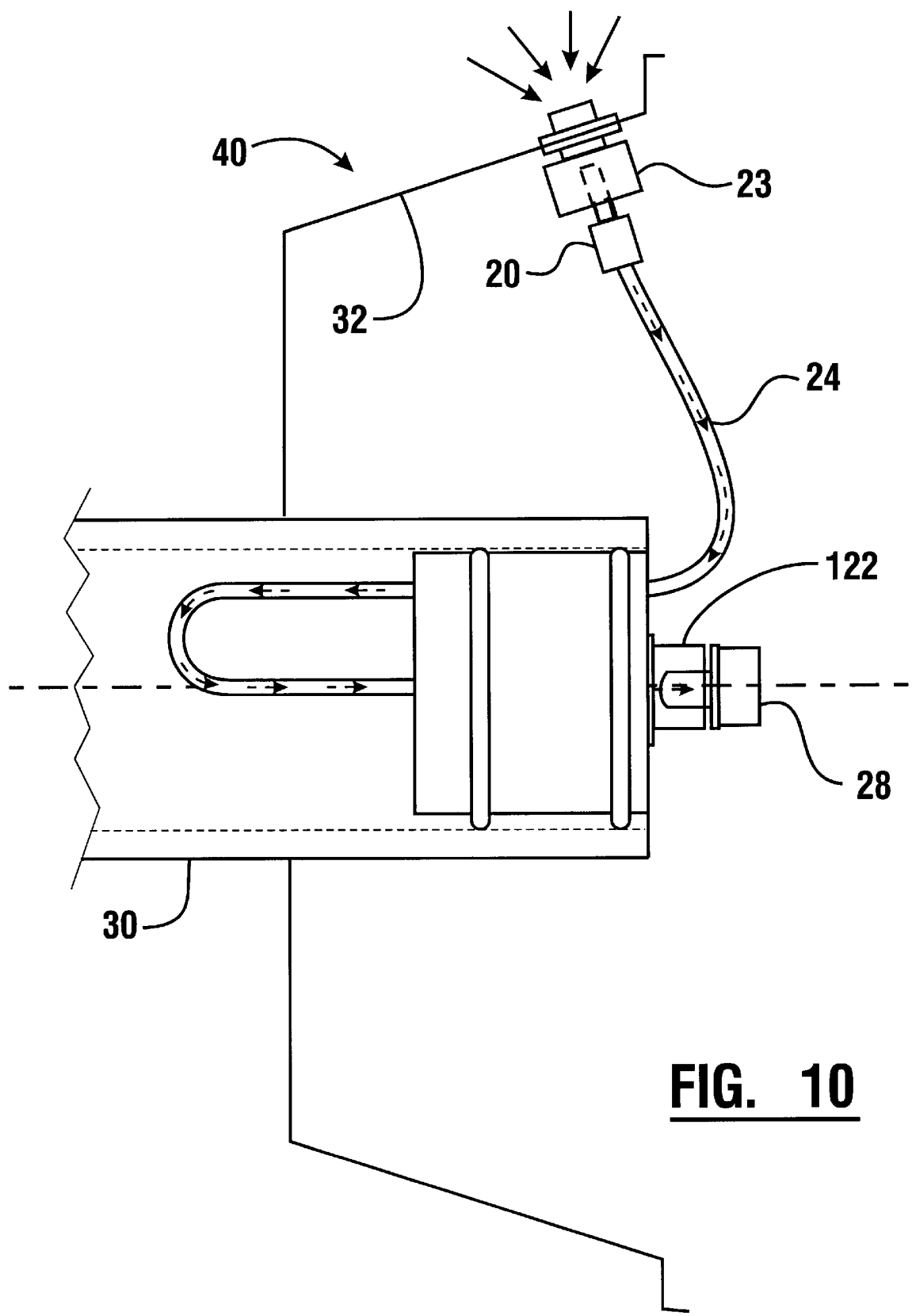
FIG. 10 is a side view of the pneumatic control of the present invention with the billet of FIGS. 4–8 in place in a cutaway of a hollow axle and a wheel, and further showing the direction of air flow from inside the tire through tubing and the billet and out through a bleeder.
Figure 11:
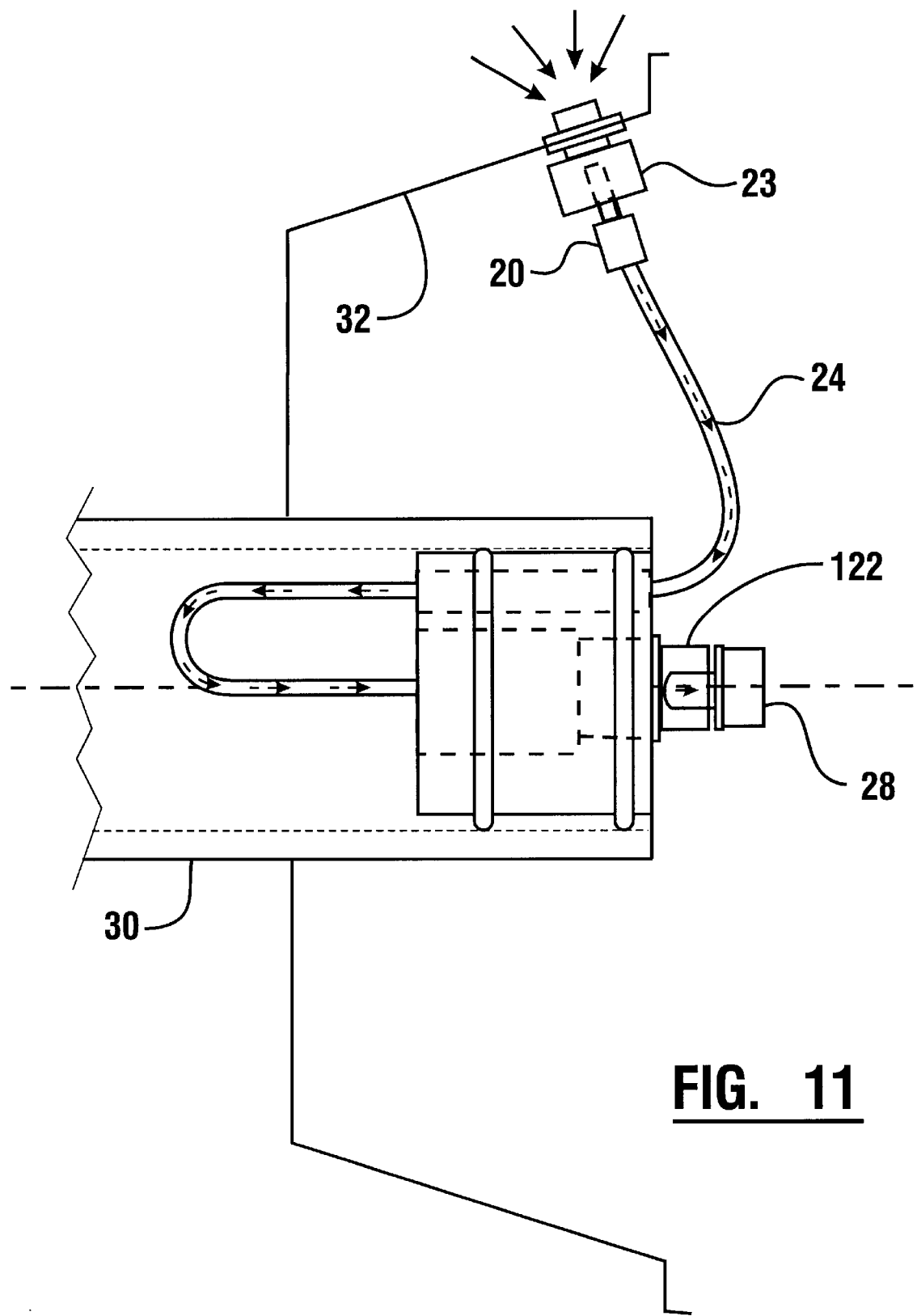
FIG. 11 is a side view of the pneumatic control of the present invention shown in FIG. 10 and further showing in phantom the coaxially aligned center passage and the offset passage through the billet.
Figure 12:
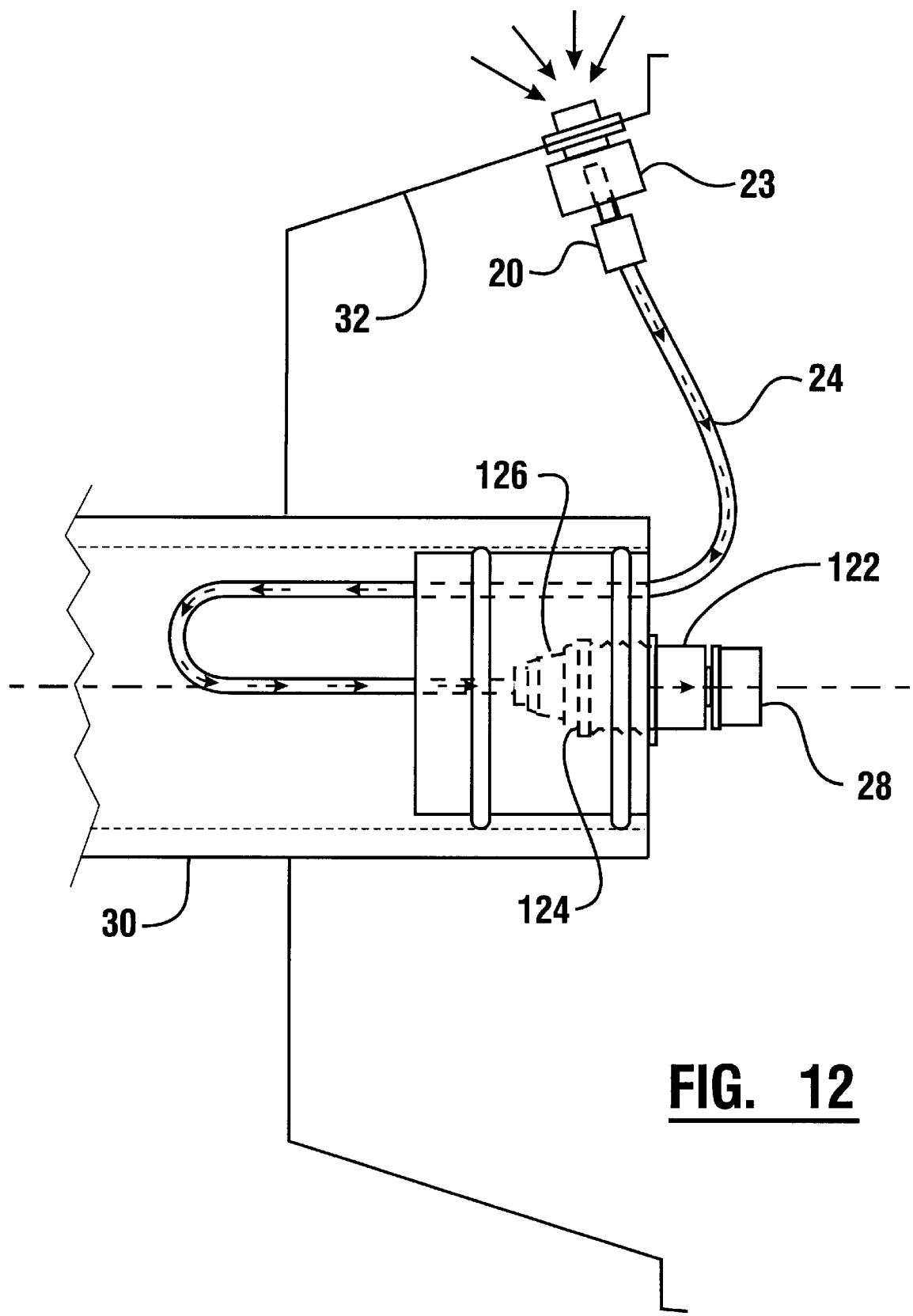
FIG. 12 is a side view of the pneumatic control of the present invention shown in FIG. 10 and further showing in phantom tubing through the offset passage and the coaxial center passage and the connection of the tubing to a coupling.
Figure 13:
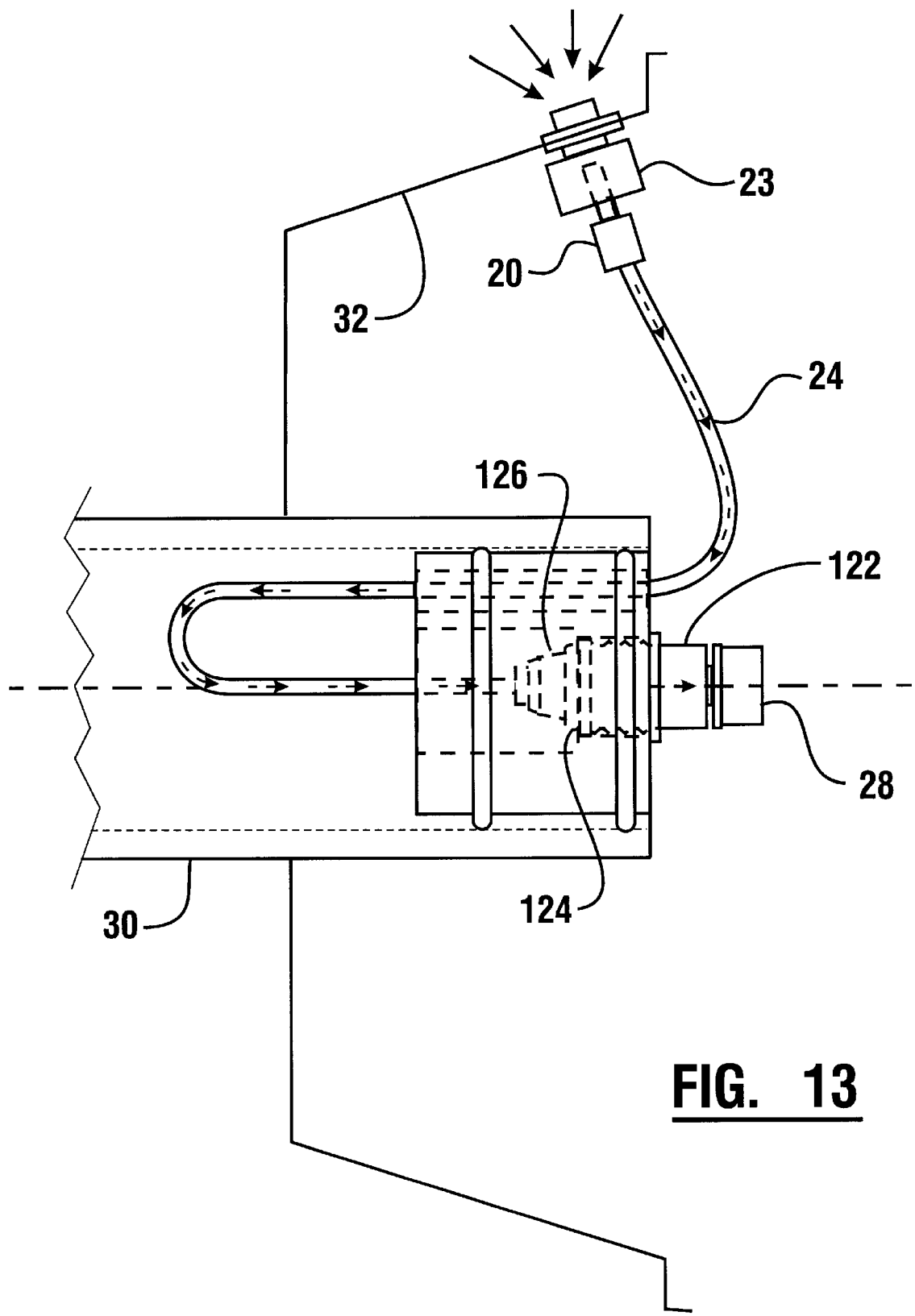
FIG. 13 is a side view of the pneumatic control of the present invention shown in FIG. 10 and further showing in phantom the coaxially aligned center passage and the offset passage through the billet and the tubing through the offset and coaxial passages and the connection of the tubing to a coupling.
Figure 14:
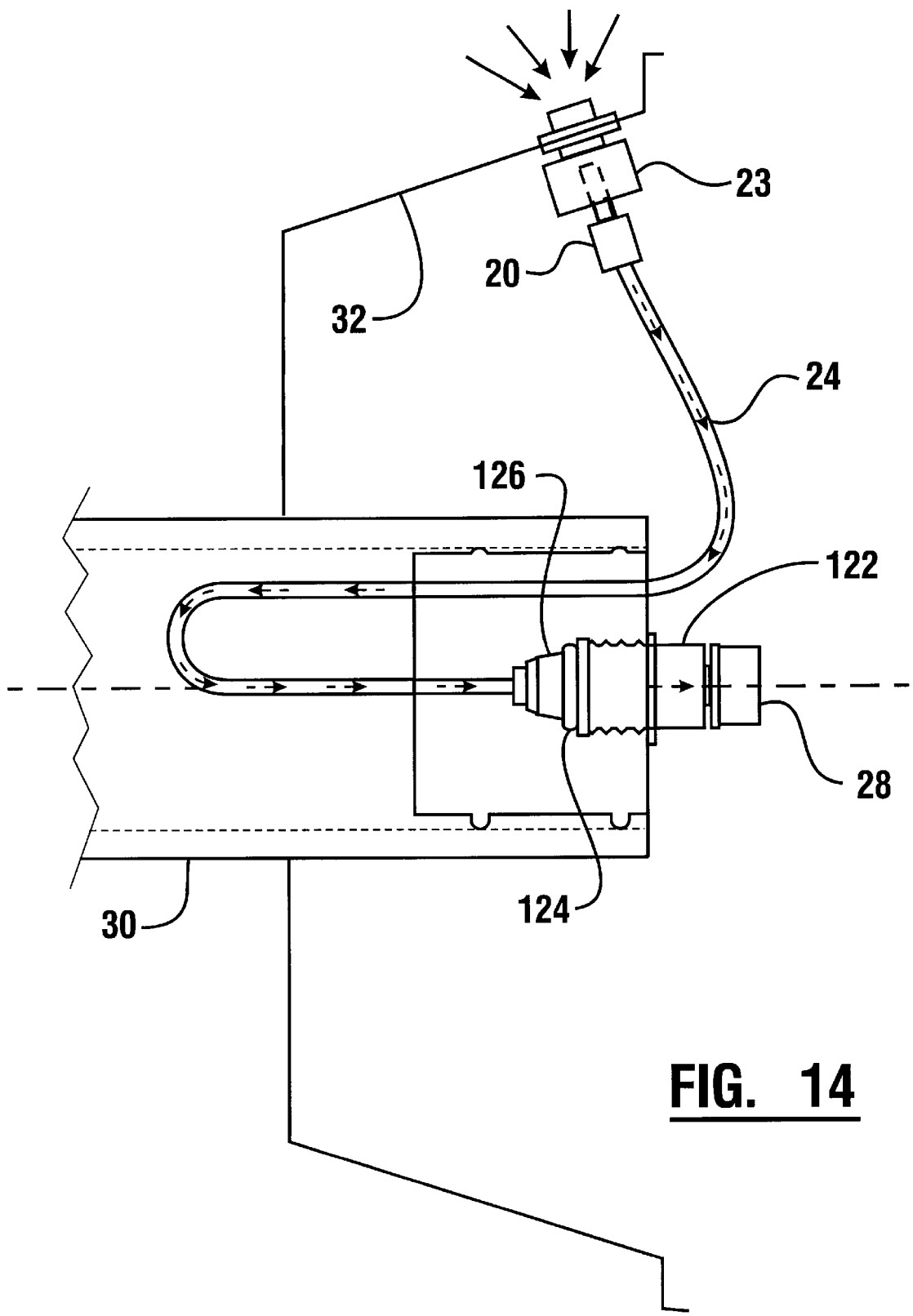
FIG. 14 is a partial cutaway side view of the pneumatic control of the present invention shown in FIGS. 10 and 12 and further showing in phantom the tubing through the offset and coaxial passages and the connection of the tubing to a coupling.
Figure 15:
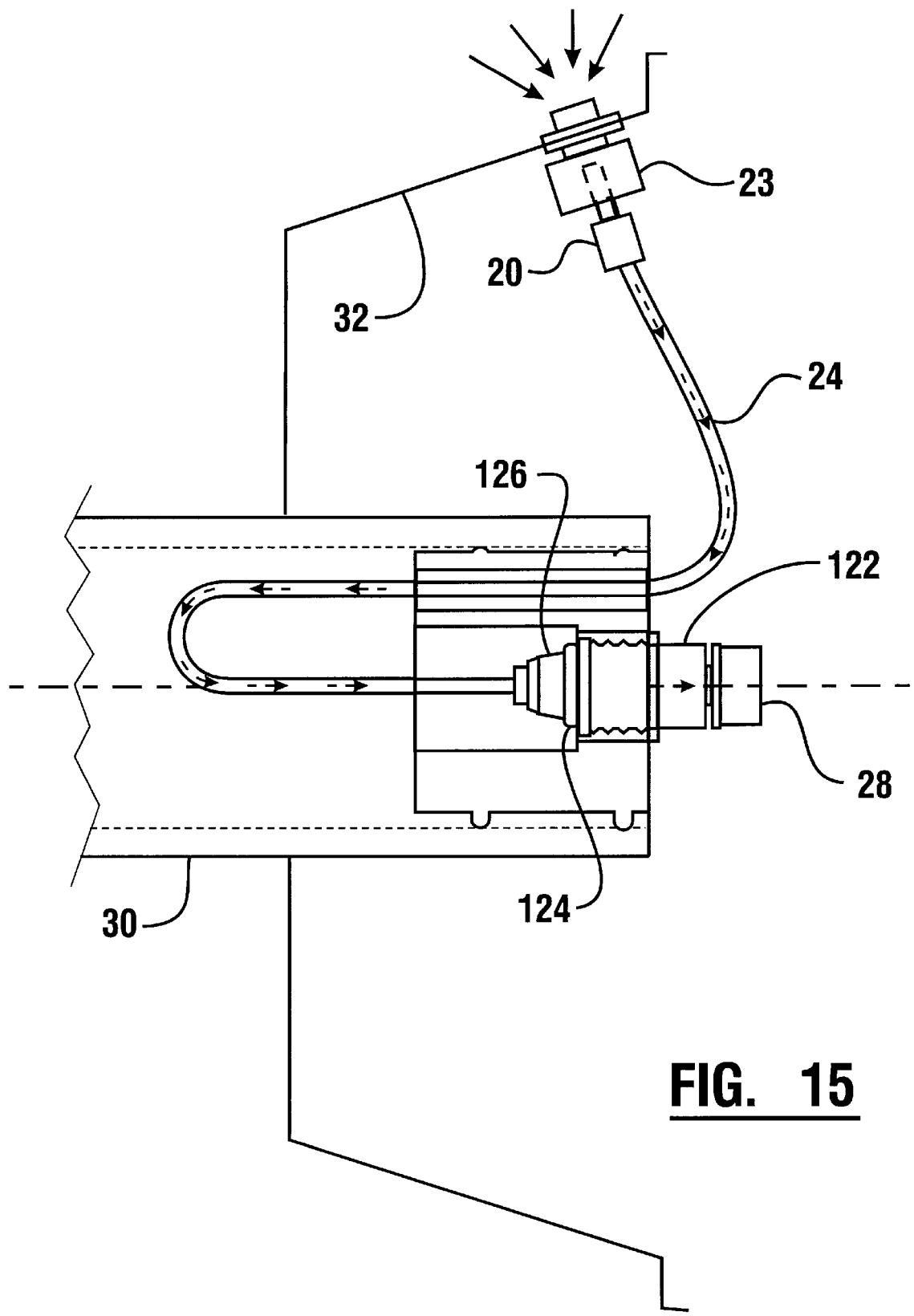
FIG. 15 is a partial cutaway side view of the pneumatic control of the present invention shown in FIGS. 10 and 13 and further showing in phantom the coaxially aligned and offset passages through the billet and the tubing through the offset and coaxial passages and the connection of the tubing to a coupling.

As shown in FIG. 3 a cylindrical billet 10 is releasably connected to an axle 30 coaxial with the centerline of axle 30. An air bleeder 28 is releasably connected to billet 10, coaxial with the centerline of axle 30. Bleeder 28 allows air above a selected pressure to pass through it to the atmosphere. A tire 40 mounted on a wheel 32 is filled with air at a gas pressure above atmospheric pressure. Tire 40 is in pneumatic connection through tubing 24 with center passage 24 of billet 10 and bleeder 28. Pressure inside tire 40 exceeding the set value of bleeder 28 operates bleeder 28 to allow air to escape until tire pressure is no longer above the set value. As wheel 32 rotates on axle 30, bleeder 28 rotates coaxially with axle 30 and is not subjected to centrifugal forces due to rotation.

Figure 2:
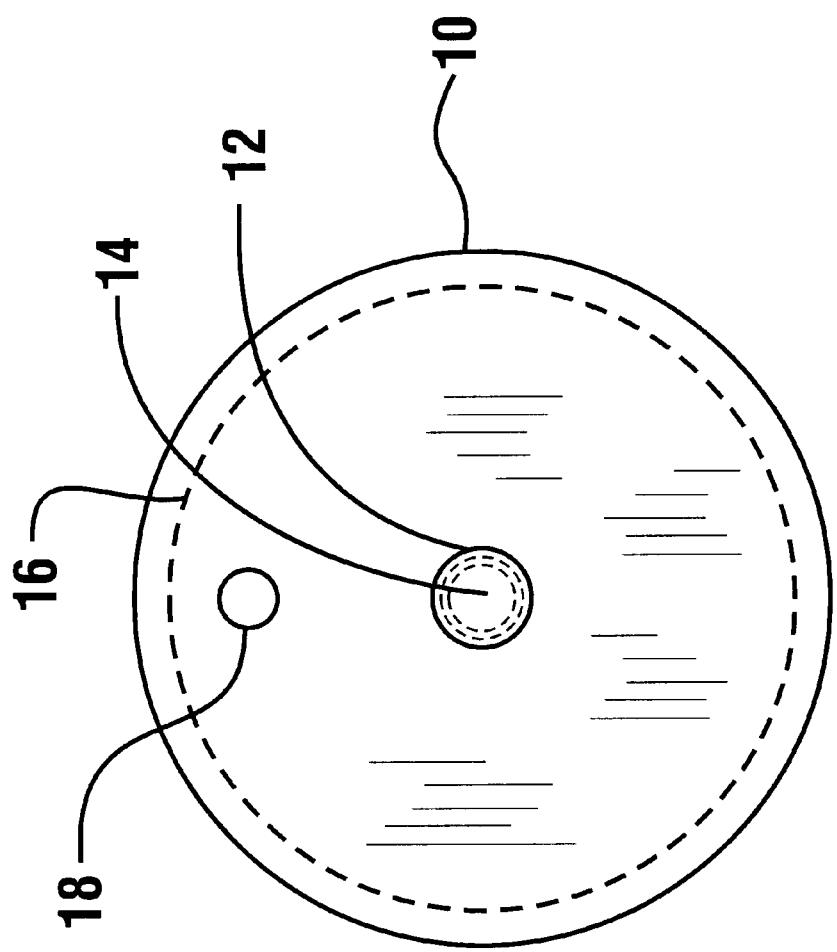
FIG. 2 is an end view of the cylindrical billet shown in FIG. 1.

FIGS. 1 and 2 show respectively a perspective view and an end view of a cylindrical shaped billet 10. As shown therein, billet 10 has a center passage 14 which runs coaxially through the axis formed by the points at the center of each circle taken at cross-sections of billet 10. Coaxial center passage 14 has a threaded tap 12 at one end and a threaded tap 13 at an opposite end. Billet 10 has a second passage 18 offset from center passage 14. Billet 10 also has a circumferential machined groove 16. In this embodiment groove 16 is adjacent one end, although it may be located at any convenient point along billet 10.

As shown in FIGS. 10–15 a cylindrical billet 110 is releasably connected to an axle 30 coaxial with the centerline of axle 30. An air bleeder 28 is releasably connected to billet 110, coaxial with the centerline of axle 30. Bleeder 28 allows air above a selected pressure to pass through it to the atmosphere. A tire 40 mounted on a wheel 32 is filled with air at a gas pressure above atmospheric pressure. Tire 40 is in pneumatic connection through tubing 24 with center passage 24 of billet 110 and bleeder 28. Pressure inside tire 40 exceeding the set value of bleeder 28 operates bleeder 28 to allow air to escape until tire pressure is no longer above the set value. As wheel 32 rotates on axle 30, bleeder 28 rotates coaxially with axle 30 and is not subjected to centrifugal forces due to rotation.

FIGS. 4 through 8 show various views of an alternative embodiment of cylindrical shaped billet 110. As shown therein, billet 110 has a counterbore 112 in one end which is coaxial with the axis formed by the points at the center of each circle taken at cross-sections of billet 110. Counterbore 112 reduces the weight of billet 112 by eliminating material, but alternative embodiments need not have a counterbore. Billet 110 has a center passage 114 which is coaxial with the axis formed by the points at the center of each circle taken at cross-sections of billet 110. Billet 110 has a second passage 118 offset from center passage 114. Billet 110 has a first circumferential groove 116 adjacent one end and a second circumferential groove adjacent a second end of billet 110. Other embodiments may have only one groove 116, or alternatively may have more than two grooves.

In the preferred embodiments of the invention billets 10 and 110 are approximately 1 inch in length and have an outside diameter selected to fit inside hollow axle 30. Billets 10 and 110 may be made of any metal or plastic compound which can be machined, molded or formed and which can withstand the operating environment of a race car axle. Aluminum is a metal which is known to have these characteristics.

In the embodiment shown in FIGS. 1–3, center passage 14 is approximately 5/16 inches in diameter with 1/8-27 National Pipe Thread (N.P.T.) taps 12, 13 at opposite ends. Offset passage 18 is approximately 3/16 inches in diameter. The center of offset passage 18 is approximately 1/2 inch from the center of center passage 14, although different diameters and offset distances may be used.

Groove 16 is approximately 1/8 in wide by 1/8 inch deep, and is located approximately 1/8 inch from the outboard end of billet 10. Axle 30 has a screw hole 35. Screw 34 is threaded through screw hole 35 to engage groove 16 thereby holding billet 10 in releasable connection within axle 30.

Referring again to FIG. 3 tubing 24 provides for pneumatic connection between tire 40 and billet 10. Tubing made of natural polyethylene provides sufficient durability and flexibility for use in a race car wheel and axle environment for use as tubing 24. An end of tubing 24 is inserted into a coupling 20, such as a Delrin Acetal Coupling. A second end of tubing 24 is routed through the outboard end of offset passage 18 to the interior of hollow axle 30. Tubing 24 reverses 180 degrees into a fitting 26, such as a Parker-Hannifin Prestolok fitting. A spring (not shown) may be placed around tubing 24 to provide reinforcement for tubing 24, as is well known when using flexible tubing. Fitting 26 is threaded into tap 12 and provides fluid communication with the interior of center passage 14.

At the outboard end of billet 10 in this embodiment a bleeder coupling 22, such as a Colder Products Company MCD 10-02 chrome plated brass coupling, allows pneumatic connection to air bleeder 28. Connection of tubing coupler 20 to wheel coupling 23 allows pneumatic connection from tire 40 through tubing 24, billet 10 and bleeder coupling 22 to bleeder 28. Arrows show the direction of air flow from tire 40 through tubing 24 to billet 10 and to atmosphere through bleeder 28.

In the embodiment shown in FIGS. 10–15, counterbore 112 has a depth of at least 1/2 the length of billet 110 and a diameter of approximately 3/4 the width of billet 110. But counterbore 112 may be any length suitable for reducing the weight of billet 110 while not interfering with grooves 116 and 117, and allowing access to center passage 114. Center passage 114 is approximately ½ inch in diameter uniformly along its length. Counterbore 112 and center passage 114 are each coaxial with the axis formed by the points at the center of each circle taken at cross-sections of billet 110. Offset passage 118 is approximately 3/16 inches in diameter. The center of offset passage 18 is approximately ¼ inch from the center of center passage 114, although different diameters and offset distances may be used.

Grooves 116 and 117 are each approximately ⅛ in wide by ⅛ inch deep and are located approximately between 1/16 inch and ⅛ inch from either end of billet 110. Gaskets 134 placed in grooves 116 and 117 have a suitable size and shape to allow billet 110 to fit snugly in axle 30 and allow for removal of billet 110. O-rings made of neoprene with a 70 durometer hardness provide sufficient durability and flexibility for use in a race car axle environment for gaskets 134. Gaskets 134 also provide a seal for the end of axle 30 and prevent entry of contaminants.

Referring again to FIGS. 10–15, tubing 24 provides for fluid connection between tire 40 and billet 110. Tubing made of natural polyethylene provides sufficient durability and flexibility for use in a race car wheel and axle environment for use as tubing 24. An end of tubing 24 is inserted into a coupling 20 such as a Colder Products Delrin Acetal Coupling. A second end of tubing 24 is routed through the outboard end of offset passage 18 in billet 110 to the interior of hollow axle 30. Tubing 24 reverses 180 degrees into a fitting 126, such as the ferruleless nut portion of a Colder Products Bulkhead Delrin Acetal Fitting. A spring (not shown) may be placed around tubing 24 to provide reinforcement for tubing 24, as is well known when using flexible tubing.

Fitting 122, such as a Colder Products Company Bulkhead Delrin Acetal Fitting, is inserted through center passage 114 from the outboard side and secured by tightening a nut 124 onto a threaded stem of fitting 122. Fitting 126 is connected to the inboard end of fitting 122. The outboard side of fitting 122 allows pneumatic connection to air bleeder 28. Connection of tubing coupler 20 to wheel coupling 23 allows pneumatic connection from tire 40 through tubing 24 and fitting 122 to bleeder 28. Arrows show the direction of air flow from tire 40 through tubing 24 to billet 110 and to atmosphere through bleeder 28.

Thus the new pneumatic control apparatus and method of the present invention achieves the above stated objectives, eliminates difficulties encountered in the use of previous devices, solves problems, and attains the desirable results described herein.

In the foregoing description, certain terms have been used for brevity, clarity and understanding. However, no unnecessary limitations are to be implied therefrom because such items are for descriptive purposes and are intended to be broadly construed. Moreover, the descriptions and illustrations are by way of examples and the invention is not limited to the details shown and described.

Further, in the following claims any feature described as a means for performing a recited function shall be construed as encompassing any means capable of performing the recited function and is not limited to the particular means described herein or mere equivalents.

Having described the features, discoveries and principles of the invention, the manner in which it is constructed and operated and the advantages and useful results attained, the new and useful structures, devices, elements, arrangements, parts, combinations, systems equipment, operations and relationships are set forth in the appended claims.

I claim:

1. A pneumatic control apparatus for controlling gas pressure inside a tire mounted on a wheel, the wheel being rotatable in operative connection with an axle, wherein the axle is rotatable about an axle centerline, and wherein the wheel is in supporting connection with a pneumatic fitting, wherein the pneumatic fitting is in fluid communication with the inside of the tire, the apparatus comprising:

a body, wherein the body is releasably connectable to the axle;

a bleeder valve mounted in supporting connection with the body, wherein the bleeder valve is coaxially aligned with the axle centerline, and wherein the bleeder valve enables gas above a set pressure to pass to atmosphere; and a tube, wherein the tube fluidly connects the bleeder valve and the pneumatic fitting, whereby gas above the set pressure is relieved from the tire.

2. The apparatus of claim 1 wherein the body is coaxially aligned with the axle centerline.

3. The apparatus of claim 2 wherein the body is cylindrical.

4. A pneumatic control apparatus for controlling gas pressure inside a tire mounted on a wheel, the wheel being rotatable in operative connection with an axle, wherein the axle is rotatable about an axle centerline, and wherein the wheel is in supporting connection with a pneumatic fitting, wherein the pneumatic fitting is in fluid communication with the inside of the tire, the apparatus comprising:

a body, wherein the body has a fluid passage terminating at a first opening on an exterior surface of the body and originating at a second opening on an exterior surface of the body, and wherein the body is releasably connectable to the axle;

a bleeder valve mounted in supporting connection with the body, wherein the bleeder valve is coaxially aligned with the axle centerline, and wherein the bleeder valve is in fluid connection with the first opening and the tube is in fluid connection with the second opening, and wherein the bleeder valve enables gas above a set pressure to pass to atmosphere; and a tube, wherein the tube fluidly connects the bleeder valve and the pneumatic fitting, whereby gas above the set pressure is relieved from the tire.

5. The apparatus of claim 4 wherein the first opening is in threaded connection with a first threaded pneumatic fitting, and wherein the bleeder valve is in releasable connection with the first threaded pneumatic fitting.

6. The apparatus of claim 4 wherein the second opening is in threaded connection with a second threaded pneumatic fitting, and wherein the tube is in releasable connection with the second threaded pneumatic fitting.

7. The apparatus of claim 4 wherein the first opening is in threaded connection with a first threaded pneumatic fitting and wherein the second opening is in threaded connection with a second threaded pneumatic fitting, and wherein the bleeder valve is in releasable connection with the first threaded pneumatic fitting and the tube is in releasable connection with the second threaded pneumatic fitting.

8. The apparatus of claim 4 wherein the body has a second passage terminating at a first opening on an exterior surface of the body and originating at a second opening on an exterior surface of the body, and wherein the tube passes through the second passage.

9. The apparatus of claim 8 wherein the first opening is in threaded connection with a first threaded pneumatic fitting, and wherein the bleeder valve is in releasable connection with the first threaded pneumatic fitting.

10. The apparatus of claim 8 wherein the second opening is in threaded connection with a second threaded pneumatic fitting, and wherein the tube is in releasable connection with the second threaded pneumatic fitting.

11. The apparatus of claim 8 wherein the first opening is in threaded connection with a first threaded pneumatic fitting and wherein the second opening is in threaded connection with a second threaded pneumatic fitting, and wherein the bleeder valve is in releasable connection with the first threaded pneumatic fitting and wherein the tube is in releasable connection with the second threaded pneumatic fitting.

12. The apparatus of claim 1 wherein the body has a passage terminating at a first opening on an exterior surface of the body and originating at a second opening on an exterior surface of the body, and wherein the bleeder valve is in fluid connection with the tube through the passage.

13. The apparatus of claim 12 wherein the body has a counterbore wherein the passage terminates at a first opening on an exterior surface of the body and originates at a second opening on a surface of the counterbore.

14. The apparatus of claim 13 wherein a second pneumatic fitting is in releasably attached connection with the passage and wherein the bleeder valve in is releasably attached fluid connection with the second pneumatic fitting.

15. The apparatus of claim 14 wherein the tube is in releasably attached fluid connection with the second pneumatic fitting.

16. The apparatus of claim 12 wherein the body has a second passage terminating at a first opening on an exterior surface of the body and originating at a second opening on an exterior surface of the body, and wherein the tube passes through the second passage.

17. The apparatus of claim 16 wherein the body has a counterbore wherein the passage terminates at a first opening on an exterior surface of the body and originates at a second opening on a surface of the counterbore.

18. The apparatus of claim 17 wherein the bleeder valve is in releasably attached fluid connection with a threaded pneumatic fitting through the passage.

19. The apparatus of claim 18 wherein the tube is in releasably attached fluid connection with the threaded pneumatic fitting.

20. The apparatus of claim 2 wherein the body has a circumferential groove.

21. The apparatus of claim 20 wherein the body is releasably connectable to the axle by a set screw cooperatively engaging the axle and the groove.

22. A pneumatic control apparatus for controlling gas pressure inside a tire mounted on a wheel, the wheel being rotatable in operative connection with an axle, wherein the axle is rotatable about an axle centerline, and wherein the wheel is in supporting connection with a pneumatic fitting, wherein the pneumatic fitting is in fluid communication with the inside of the tire, the apparatus comprising:

a body, wherein the body is coaxially aligned with the axle centerline and has a circumferential groove and is releasably connectable to the axle by a gasket cooperatively engaging the axle and the groove;

a bleeder valve mounted in supporting connection with the body, wherein the bleeder valve is coaxially aligned with the axle centerline, and wherein the bleeder valve enables gas above a set pressure to pass to atmosphere; and a tube, wherein the tube fluidly connects the bleeder valve and the pneumatic fitting, whereby gas above the set pressure is relieved from the tire.

23. A method for controlling gas pressure inside a tire mounted on a wheel, the wheel being rotatable in operative connection with an axle, wherein the axle is rotatable about an axle centerline, and wherein the wheel is in supporting connection with a pneumatic fitting, wherein the pneumatic fitting is in fluid communication with the inside of the tire, the method comprising the steps of:

rotating a bleeder valve in coaxially aligned relation with the axle centerline wherein the bleeder valve enables gas above a set pressure to pass to atmosphere; and fluidly connecting the bleeder valve and the pneumatic fitting, wherein gas above the set pressure is relieved from the tire.

24. The method of claim 23 wherein in the connecting step a tube fluidly connects the bleeder valve and the pneumatic fitting.

25. The method of claim 24 wherein in the rotating step the bleeder valve is in supported connection with a body, and wherein the body is coaxially aligned with the axle centerline.

* * * * *